United States Patent
Hauck et al.

(10) Patent No.: US 7,483,454 B2
(45) Date of Patent: Jan. 27, 2009

(54) LASER SYSTEM ARCHITECTURE AND METHOD OF USING THE SAME

(76) Inventors: James P. Hauck, 2658 Del Mar Heights Rd., Del Mar, CA (US) 92014; G. Alexsana Donne, 12 Sweetgrass La., Rolling Hills Estates, CA (US) 90274-5134

( * ) Notice: Subject to any disclaimer, the term of this patent is extended or adjusted under 35 U.S.C. 154(b) by 421 days.

(21) Appl. No.: 11/441,775

(22) Filed: May 26, 2006

(65) Prior Publication Data

US 2007/0274353 A1    Nov. 29, 2007

(51) Int. Cl.
*H01S 3/10* (2006.01)
*H01S 3/13* (2006.01)
*F21V 9/00* (2006.01)
*G02B 27/20* (2006.01)

(52) U.S. Cl. .............. 372/23; 372/29.01; 362/231; 362/259

(58) Field of Classification Search ............... 372/23, 372/29.021, 68; 362/259
See application file for complete search history.

(56) References Cited

U.S. PATENT DOCUMENTS

| | | | | |
|---|---|---|---|---|
| 6,190,022 | B1 * | 2/2001 | Tocci et al. | 362/259 |
| 7,040,780 | B2 * | 5/2006 | Diehl | 362/259 |
| 2005/0279205 | A1 * | 12/2005 | Rode | 89/1.11 |

* cited by examiner

*Primary Examiner*—Armando Rodriguez
(74) *Attorney, Agent, or Firm*—Stetina Brunda Garred & Brucker

(57) ABSTRACT

A color dazzle system to enhance area denial to personnel mission for law enforcement, homeland security, border patrol, and the military effectively by interrupting the ability of combatants to continue with their intended mission. The color dazzle system has a multi-wavelength laser module for generate desired color or wavelength ranges of light, a beam projector module for pointing the light towards the target to be dazzled, and a fiber optic beam delivery system for delivering the light to the beam projector module. By adjusting the power output according to the corresponding wavelength and the distance to the target, and quickly switching between the wavelengths of light, a dazzle effect can be obtained with an irradiance within a safety range for the eye.

30 Claims, 2 Drawing Sheets

LASER SYSTEM ARCHITECTURE AND METHOD OF USING THE SAME

CROSS-REFERENCE TO RELATED APPLICATIONS

Not Applicable

STATEMENT RE: FEDERALLY SPONSORED RESEARCH/DEVELOPMENT

Not Applicable

BACKGROUND

This present invention relates in general to a laser system architecture and a method of using the same, and more particularly, to a laser system architecture operative to generate an eye-safe multi-wavelength beam to temporarily blind or dazzle eyes or sensors of an opponent.

Dazzlers are a form of optical counter measures (OCM), which is a technique where an opponent or the sensor of an opponent is temporarily blinded (dazzled). To be considered non-lethal, the OCM irradiation must be below the threshold of permanent damage to the eye. This puts a significant constraint on the irradiance power/area that can be used, directions of illumination and illumination duration. Many dazzlers currently available on the market are thus dazzle ineffective for being unable to generate the dazzler beam with sufficient brightness.

BRIEF SUMMARY

A color dazzle system is provided to enhance area denial to personnel missions for both law enforcement and the military effectively by interrupting the ability of combatants to continue with their intended mission. The laser system architecture called as the color dazzle system includes a multi-wavelength laser module for generation of the desired color or wavelength ranges of light, a beam projector module for pointing the light towards the target to be dazzled, and a fiber optic beam delivery system for delivering the light from the laser module to the beam projector module, if needed.

The multi-wavelength laser module includes a plurality of lasers each being operative to generate a wavelength range of light. Preferably, the output power beam spread, and pulse duration for each of the laser is adjustable according to the distance to the target and characteristics of the target to ensure the light is effective to dazzling the target, and will not permanently damage the eye. In addition, at least a portion of the lasers are operative to respond quickly enough to output the light with a dazzle effective rate. In one embodiment, the multi-wavelength laser module includes at least a red laser operative to generate light at the wavelength range of 590 nm to 800 nm, preferably 630 nm to 670 nm, a green laser operative to generate 520 nm to 565 nm, preferably 524 nm or 532 nm of light, a blue/green laser for generating 475 nm to 520 nm of light, a blue laser for generating 435 nm to 475 nm of light, a violet laser for generating light at 380 nm to 435 nm, preferably 405 nm, and an ultra-violet operative to generate light at the wavelength range from 310 nm to 380 nm. The use for sensors would also suggest sources in the near and/or short wave infrared range (from 800 nm to 1600 nm).

The beam projector module is configured according to the specific application. For example, the beam projector module can be configured to fire like a pistol, a rifle or a machine gun. The beam projector module includes at least a pair of switches or a two-stage switch allowing the user to activate and operate the multi-wavelength laser module in two separate stages. The beam projector module includes at least one lens movable for adjusting divergence of the light projected thereby.

The fiber optic beam delivery system includes a fiber optic cable for delivering the light generated by the multi-wavelength laser module to the beam projector module and a plurality wires for transmitting signals from the beam projector module to the multi-wavelength laser module. In the baseline design, the signals carry at least the activation and operation information for the multi-wavelength laser module. When an intelligent controller is incorporated, the signals carry additional information such as the reflected signal strength for adjusting the output power and duration for each individual laser and for adjusting the beam divergence. The beam projector module may also include a target locator for actively locating the target to be dazzled and to provide the location information of the target to the intelligent controller or to the user. In application, the target locator can also be used to acquire and track the opponent.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Being restricted by the maximum permissible exposure (MPE) defined by ANSI Z136.1, the allowable irradiance of an eye-safe dazzling beam is typically insufficient to create an effective dazzling effect when the ambient illumination is high and/or the size of the pupil of eyes or sensors is small. Such restriction makes it necessary to direct the entire dazzling beam into an eye of an observer to achieve a daytime dazzle effect. In addition to the direct exposure to the eye, rapid variation between wavelengths and control of flicker frequency for each wavelength may also improve the dazzling effect. Therefore, by designing a dazzler operative to generate a multi-wavelengths beam and rapidly switch the beam between different wavelengths, accurately control the flicker frequency for each wavelength, and precisely point the beam towards the target, a dominate dazzling effect may be achieved without increasing intensity of the dazzling beam beyond the safety range.

Figure 1:
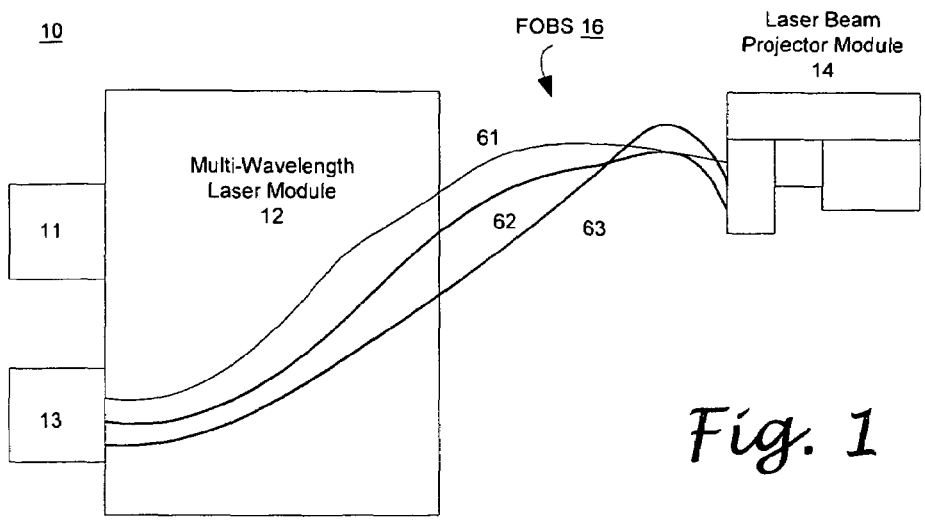
FIG. 1 illustrates a dazzler and the connection between various modules for forming the dazzler.

As shown in FIG. 1, the dazzler 10 includes three major modules, including a multi-wavelength laser module 12 for generating a beam at a desired wavelength, a beam projector module 14 allowing the user to precisely point the beam towards the target, so as to temporarily blind the target, and a fiber optical beam delivery system 16 for interfacing the multi-wavelength laser module 12 and the beam projector module 14. The dazzler 10 further includes an energy store subsystem 11 for supplying power to the multi-wavelength laser module 12 and the beam projector module 14, and a control board subsystem 13 for controlling pulse duration and power level of specific wavelength of light generated by the multi-wavelength laser module 12.

In order to provide the maximum allowed pulse and power for both a nearby target with dark-adapted eyes (iris open) and a target at 60 m to 100 m with light adapted eyes (small), the multi-wavelength laser module 12 incorporates multiple lasers operative to generate multiple wavelengths of light with independently adjustable pulse lengths and power levels. Various types of lasers such as direct diode lasers and diode pumped solid state lasers (DPSSL's) are available to serve as the laser sources. The direct diode lasers offer the advantages of compactness, simplicity, high efficiency and long lifetime, but have the disadvantages of cooling problems and limited wavelength selections. The conventional diode pumped solid state lasers are not as compact or efficient as diode laser. However, the high peak power capabilities of the diode pumped solid lasers allow the use of non-linear-optic (NLO) techniques for frequency conversions, such that more wavelengths of beam can be generated. Recently, very compact diode pumped solid state lasers have become available and referred as "nano- or micro-lasers".

Figure 2:
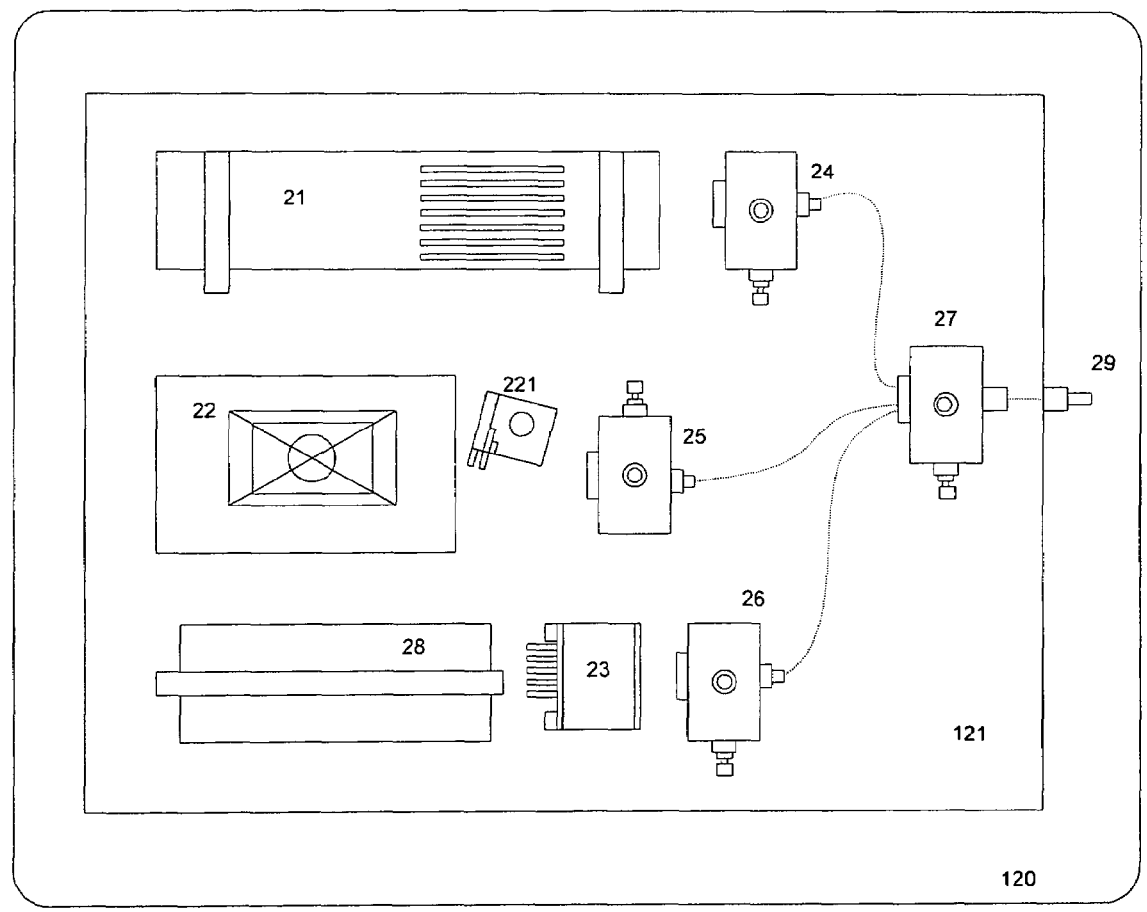
FIG. 2 shows the layout of a multi-wavelength laser module of the dazzler.

FIG. 2 illustrates an exemplary multi-wavelength laser module 12, namely, a tri-laser module, including a red laser 23, a green laser 22 and a violet laser 21 to generate red light at about 650 nm or deep-red light at about 700 nm, green light at about 532 nm and violet light at about 405 nm, respectively. The red laser 23 includes as an indium gallium aluminum phosphide laser diode capable of generate up to 500 mW of red light, for example. A red laser and thermal-electric cooler driver is used for driving the red laser 23, for example. A frequency doubled neodymium yttrium aluminum garnet laser at 1064 nm, which is doubled to 532 nm with up to 150 mW by an internally mounted crystal, is used for the green laser 22. The violet laser 21 is provided by a gallium nitride laser diode with an output up to 50 mW, for example.

The red light beam about 650 nm is found to be effective during nighttime or partially darkened conditions (scotopic vision). However, the daytime (photopic vision) sensitivity of the red light beam is reduced by an order of magnitude; particularly, as much red ambient light exists, the red light beam is not dazzle effective during bright daylight. The eye scotopic and photopic sensitivities for the green light beam are comparable; and therefore, the daytime green dazzle effective is similar to the nighttime dazzle effect. Although the violet light is almost invisible to the eye during daylight conditions, it can causes fluorescence at longer wavelengths at the blue part of the spectrum. The violet/blue scotopic sensitivity is 100 times greater than the photopic sensitivity leading to enhanced effectiveness under low light conditions. As it has been suggested that alternating blue and red can cause a particularly effective dazzle, the addition of the violet laser 21 provides a significant new capability to the dazzler 10.

Although the embodiment as shown in FIG. 2 includes only three lasers 21-23 for generating three visible light beams, from the application point of view, it is desired to generate a wide range of wavelengths scattered across the near visible spectrum to defeat any possible addition of protective goggles or filters used by enemy combatants. Therefore, a laser module including more than three lasers operative to generate more than three, for example, up to eight wavelengths of light will be desired. Further, many of visible wavelengths may be generated by high performance near infrared (NIR) and near ultra-violet (NUV) lasers and non-linear optical frequency converter.

The red, green and violet lasers 21, 22 and 23 can be operated with various power levels, pulse frequency, and pulse width. The power levels are varied with the distance of the target and target characteristics to ensure the output is eye-safe and effective. There are three general regimes of operation, including a continuous wave mode, a low-frequency pulse, that is, the pulse frequency is low enough allowing the eye to perceive the temporal variation, and high pulse repetition frequency. Among three operation modes, the low frequency modulation that can be disorienting at selected frequencies and pulse formats may have a significant dazzle effect to at least to a segment of the population. Pulse laser fundamentally by producing pulses that are much shorter than the pulse separation. This will cause the irradiance $M_{MPE}$ as measured in Joules/cm$^2$ required for dazzle effective to be duration dependent. A high pulse repetition frequencies (>50 Hz), the light appears to be continuous to the human eyes; however, the peak power can be still quite high, and the frequency conversion efficiency quite high for lasers with PRF's in the kHz range. As a matter of fact, many of the efficient and affordable diode pumped pulse lasers operate in this mode.

In the embodiment as shown in FIG. 2, the red, green and violet lasers 21, 22 and 23 are selectively operated with full power or a percentage of the full power in a plurality of steps. The control board subsystem 13 as shown in FIG. 1 may include two rotary multi-position potentiometers adjustable by rotation knobs accessible to the user for varying the power levels of the red and violet lasers 21 and 22. For example, 8-position knobs may be used and rotated to vary the power levels of the red and violet beams from 4 mW to 480 mW and ½ mW to 50 mW, respectively. The green laser beam is preferably adjustable from less than 1 mW to 140 mW; different knob or controller is required because the mechanism for varying the power of the green beam is achieved by using a variable transmission neutral density filter. The pulse duration of the red, green and violet lasers 21, 22 and 23 can be controlled by a separate set of knobs in a similar fashion from $\frac{1}{16}^{th}$ seconds to 4 seconds. The values of the powers and the pulse durations are selected to cover the intended range of operation of the laser and the anticipated range of operation for the dazzle effect. Alternatively, a touch panel may also be provided allowing the user to manually control the lasers 21, 22 and 23. In addition to the manual operation, the lasers 21, 22 and 23 can also be automatically controlled by an active sensor system.

Further referring to FIG. 2, lens/fiber mounts 24, 25, 26 are located at the outputs of the red, green and violet lasers 21-23, respectively, for coupling the red light beam, green light beam and blue light beam to beam combiner at the lens/fiber mount 27, through which the red light beam, the green light beam and the violet light beam can be combined into one beam and output from the output aperture 29. Lens or fibers can be mounted at the lens/fiber mounts 24-26 for guiding the red, green and violet light beams propagating towards the beam combiner mounted at the lens mount 27. When fibers are used, a beam combiner fiber optic stub is installed at the lens/fiber mount 27, and the complexity of alignment is greatly reduced. The tri-laser module 12 is preferably integrated as 121 and installed in a container 120 such as a pelican case with a size less than ½ cubic foot that can be carried in a backpack in a one-arm version for convenience. The energy store subsystem 11 is preferably a battery mounted internal to the container 120 and replaceable by opening the container 120 with a number of clasps.

Depending on the applications, many configurations are available for the dazzler 10. For example, the entire dazzler 10 can be handheld and fire like a pistol; or alternatively, the laser module 12 and the beam projector module 14 can be handheld, while the battery can be contained in a holster. For the convenience of the user, the multi-wavelength laser module 12 and a power supply are small enough and kept in a backpack, while the laser beam projector module 14 can be strapped to the back of the hand. The beam projector module 14 can also be mounted on a pistol which is plugged into a fiber leading from the backpack to the pistol. To facilitate a greater magazine depth, the multi-wavelength laser module 12 and the beam projector module can both be charged in the backpack and removed to fire like a rifle or machine gun. In contrast with the handheld configurations, the entire dazzler 10 can also be mounted to a target designator, range finder or a turret.

Figure 3:
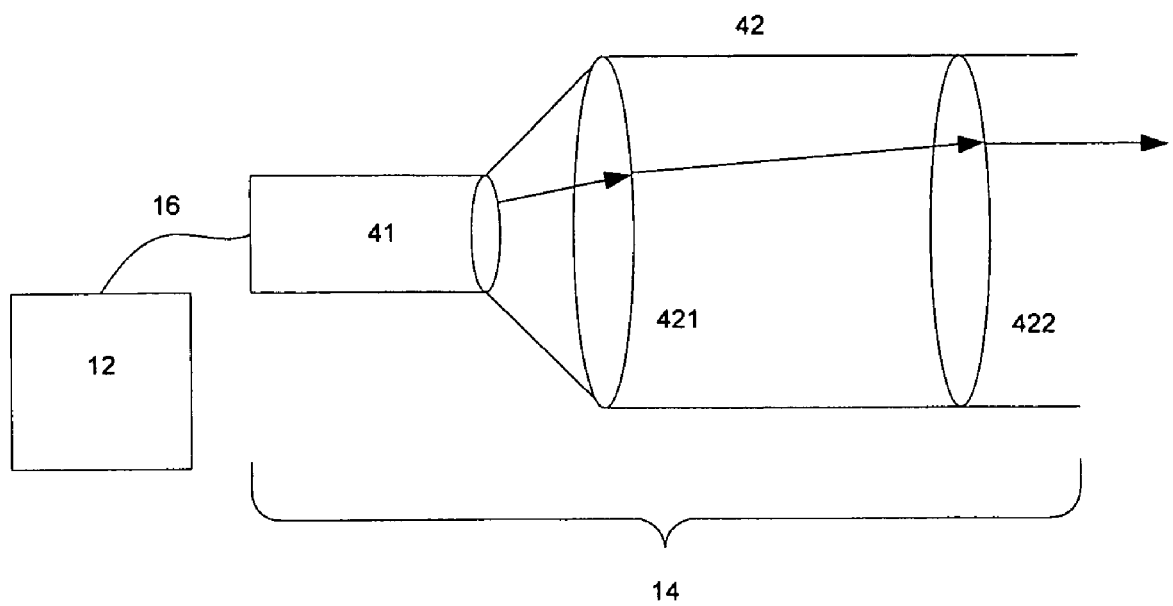
FIG. 3 shows an exemplary configuration of a laser beam module.

The purpose of the laser beam projector module 14 is to expand and collimate light generated by the multi-wavelength laser module 12 with an optimal beam divergence and spot size, so as to achieve a dazzle effect to a target at various locations. For example, the light emanating from the fiber optic cable 16 of the fiber optical beam delivery system will be expanded and collimated with a maximum divergence of about 10 milliradian (mR) and a spot size that illuminates the eyes of an individual at 100 meters by the laser beam projector module 14. A baseline design of the laser beam projector module 14 is to allow the dazzler 10 in a simple, compact, and relatively fixed configuration to mount below the barrel of a military or law-enforcement pistol. Preferably, the baseline laser beam projector 14 may have either of two apertures in the range of 1" to 2" and is designed to be eye-safe at the exit aperture. The simplest version using a single short focal length lens is capable of projecting a face sized (100 mm to 150 mm diameter spot) at 7meters or more. The divergence is about 4 to 16 milliradians, such that the spot size at the long range is larger than desired while it is still capable of providing a considerable dazzle effect during fully dark adapted condition. The embodiment as shown in FIG. 3 is a laser beam projector module 14 which incorporates two lenses 421 and 422 in a telescope 42 to provide smaller divergence (less than 10 milliradians, for example) and a collimator 41 which is typically used with in the smart laser beam projector module 14, that is, a laser beam projector module 14 including an intelligent control device for automatically controlling the pulse duration and power for individual wavelength of light. The divergence can be further reduced to about 4 milliradians by using more complex optical configurations such as nonspherical conic lenses.

For laser beam projectors, any combination of lenses from one or more which meets the beam parameters desired can be used and the preceding using two is used for illustration.

Various types of commercially available lenses can be assembled in the laser beam projector module 14. The spaces and specifications of the lenses 421 and 422 are determined and selected in response to the numerical aperture of the fiber optic cable 61 and characteristics of the collimator 41. For each assembly, the distance between the fiber optical cable 61 and the first lens 421, and the distance between the first and second lenses 421 and 422 are varied and optimized in order to obtain the required divergence that can be derived by:

$$\text{Divergence} = \frac{(\text{Beam Diameter at Target Distance}) - (\text{Pupil Diameter})}{\text{Target Distance}},$$

where the pupil diameter is the diameter of the beam just after the lens 422.

As shown in FIG. 1, the optical fiber beam delivery system 16 includes at least an optical fiber cable 61 for delivering the beam generated by the multi-wavelength laser module 12 to the beam projector module 14 and two wires 62 and 63 for transmitting signals from the beam projector module 14 to the multi-wavelength laser module 12. When the baseline design without the intelligent controller for power and pulse duration is provided as the beam projector module 14, the signals to be transmitted by the wires 62 and 63 include an activation/safety signal which activates at least one of the lasers 21-23 into a ready or stand-by status and an operation/fire signal which fires at least one of the lasers 21-23. When the intelligent controller is incorporated, signals carrying information of the power levels and pulse durations are also transmitted from the beam projector module 14 to the multi-wavelength laser module 12 via the existing wires 62 and 63 or additional wires.

As discussed above, the design of an effective dazzler is dependent on many parameters, including the dazzle factors, environment factors, projector factors, and laser source factors. The system requirements to achieve dazzle effect include the irradiance required at each wavelength to achieve dazzle effect, the field of view of illumination of the object being dazzled, the duration of dazzling illumination, the duration of persistence of the dazzle effect, the factors related to the tolerance of the object being dazzled. The environment parameters include the range to the target, the presence of scatterers, the presence of diffuse and specular reflectors, and other environment factors. The projector factors include the size of the projector as required, the divergence of the projected beam, the uniformity of illumination, the pointing precision, and other projector factors. The laser source factors include the power available at each wavelength, the wavelength versatility, and the temporal modulation of the laser beams. The effects and impacts of each of the parameters are discussed as follows.

It has been reported that $50\mu W/cm^2$ of laser exposure was effective in producing glare but not flash blindness, while the intensity of $10^4$ to $10^6$ mL (millilux) (approximately 0.003 to 0.3 mW/cm$^2$) of laser beam leads to long recovery times after being flash blinded. Many researchers show that the recovery time from flash blindness for the target increases as the intensity of the laser beam increases and decreases as the target luminance increases. Preferably, analysis of the dazzler as provided uses both radiometric values (mW/cm$^2$) and photometric quantities (lux) in photopic (day), scotopic (fully dark) and twilight conditions. In addition, it appears that using the photometric quantities such as illuminance lux or lumens/meter$^2$, the corresponding effective values correspond to a few lux under dark conditions to thousands of lux under partially illuminated conditions.

If the laser beam is a point source, the effect will be limited to a small region in the focused eye. If the beam is bright enough, some light will be scattered and a "veiling glare" will also occur. The veiling effect for red is observable, and becomes very pronounced at shorter wavelengths. Generally, almost all materials scatter more light at shorter wavelengths, and the eye and eyeglasses do not appear to be an exception. Further, wavelengths in the ultraviolet, violet and to a lesser extent the blue part of the spectrum cause fluorescence, that adds noticeably to the glare.

In the ANSI Z136.1 standards, a maximum permitted exposure that grows in proportion to the angular subtense of the laser beam. The light is spread across a larger portion of the eye, and the eye can tolerate a larger amount of light without damage. At the same time, the dazzle effectiveness will increase with the angular subtense of the source. Therefore, there exists a growing limit and a growing effectiveness for a larger transmitter aperture. In addition, it has been found that the larger the aperture, the more cumbersome the dazzler. In the design of a small dazzler, the aperture is configured between 25 to 50 mm, which corresponds to an angular subtense of 2.5 to 5 milliradians at a distance of 10 m. The angular subtense may grow up to about 10 mR as with shorter distance.

The duration of the dazzle illumination is affected by several factors, including the blink response, eye aversion, and pupil dilation. As these factors vary from person to person, a general duration of about a quarter second is used for the laser exposure. The natural tendency is for the eye to go to the bright source of light at first, and then blinks upon the light exposure. For the dazzler to be useful, persistence of the dazzle effect after the laser pulse is off is required. The useful duration of the dazzle effect lasts from several seconds to tens of seconds.

As discussed above, the presence of eyeglasses, dark glasses, goggles, or other eyeware, and filters may block the laser beams to propagate through the eye or sensor, so as to prevent the eye or sensor from being dazzled thereby. Therefore, the dazzler as designed here includes a plurality of lasers each being operative to generate laser beam with a wider range of wavelengths. For example, in the embodiment as shown in FIG. 2, the green laser 22 is operative to generate light at the wavelength of 524 nm to 532 nm, the violet laser 23 is operative to generate light at the wavelength of 400 nm to 440 nm, and the red laser 21 is operative to generate light at the wavelength of 635 nm to 800 nm. In this manner, if the opponent attempts to counter the dazzle effect by using dark glasses, such dark glasses has to be broadband or neutral density which inevitably takes light away from the opponent.

Other dazzle factors include the dilation of the eye in response to a loud sound. Therefore, the dazzler as provided above may include a sound generator for providing a flash bang and a scatter source for scattering the laser beam near the dilated eye. Thereby, the dazzle effect can be improved.

Among various environment factors, the first to consider and analyze is the distance to the target. For the small hand-held units of dazzlers, the beam projector aperture will be smaller than the separation of the eyes, such that the beam must diverge. Therefore, it is very desirable to have the ability to vary the divergence (zoom the illuminator). In most cases, if the target is less than 7 meters away, the user will probably fire the lethal weapon. Beyond 7 meters out to a few tens of meters, the beam will need to diverge to about 120 mm or more to cover both eyes, and to allow for pointing accuracy. Therefore, the beam projector should be able to provide a beam divergence in the range of a few milliradians to a few tens of milliradians. Therefore, to the extent that the beam can be zoomed to a sufficiently small angle, the range of the dazzler can be quite large provided that the user can point adequately. Presumably, the user will be able to know approximately the range that they will need to use the dazzler, so as to preset the dazzler to a wide, medium or narrow range application. In addition, an automatic target locator may be installed in the beam projector module to actively locate the target and to derive the desired divergence based on the target distance as located.

The presence of scatters in the beam path can have a profound effect on the dazzle effect. Preferably, the scattering particles are comparable in size to the wavelength of visible light. The particulates near the assailant could produce a bright flash in all directions nearby, so as to contribute to the dazzle effect. A smoke grenade that explodes near a group assailants could then be illuminated and produce a local dazzle effect. Therefore, the dazzler as provided may further comprise non-lethal weapon such as smoke grenade or flash-bang to improve the dazzle effect. In addition to the scatterer such as the smoke grenade, the dazzler applied in fog or natural clouds may also obtain enhanced dazzle effect. Also the diffuse and specular reflectors in the environment can have a significant impact such as directing the beam to the target by diffusion or reflection.

The major factor associated with the dazzler is the physical size of the beam projector module, and the most fundamental requirement for the beam projector module is to provide an optical aperture to limit the exitance (power/area) to be less than the maximum permissible exposure is the most fundamental. For the low maximum permissible exposure value of $10$ $mW/cm^2$, an output aperture as big as tens of millimeters is required for output power of tens or hundreds of mW for most dazzlers. The length of the beam projector module depends on the design of the source and the optic contained in the dazzler, including the focal length of the lenses used therein and the beam divergence of the source, for example. In one embodiment, the dazzler may be configured with f/2, that is, a focal length is about twice the aperture diameter f~2D. In addition, the minimum beam divergence of an optic device is set by the diffraction limit defined as $\theta$, which, for the red laser at a wavelength of 600 nm and an aperture of 24 mm is about 0.06 milliradians, clearly diffraction is not the limiting factor for these beam projectors.

The divergence of a useful projected beam depends on the laser power and the irradiance required for achieving the dazzle effect. The other factor may vary the divergence is the requirement of dazzle both eyes of the assailant or opponent at the same time. As the typical eye separation is about 60 mm, another 60 mm has to be added for pointing. Zoom is a variable divergence of the projected beam. For a single-lens projector, the way zoom can be implemented is to move the source of the beam by small distance near the focal point of the lens. In the geometric optics limit, a small source placed near the focus of a lens produces a beam that is parallel. With diffraction, the beam spreads in response to the quality of the source and the lens aperture. By moving the source towards the lens, the beam will naturally diverge. In contrast, the beam will converge if the source is moved away from the lens. The diameter of the lens is also dependent on the goal to capture all the light from the source. When the source is a laser, a lens with a diameter of a few millimeters can usually achieve such goal. With a fiber optic source, the emergent light will have a natural divergence of $\Theta=2*NA$, which is about 0.4 to 0.8 radians. The ratio of the focal length to aperture of the lens used to capture the light is about $f/\#=\frac{1}{2}NA \sim f/2.X$ or faster. In one embodiment, a beam projector with a range between f/2.5 and f/1.2 is designed.

The uniformity of the irradiance in the illuminated area depends on several factors, including the nature of the source such as Gaussian profile, super-Gaussian, top hat, or other non-uniform distribution, number, types, and optical characteristics of lenses, and the propagation through the train such as vignetting, and atmosphere. The major ways that beam uniformity comes into consideration are that the highest irradiance within the beam needs to meet the maximum permissible exposure limits (so "hot-spots" in the beam limit of the total amount of power or energy that can be transmitted). The other way uniformity is relevant is a question whether producing the dazzle effect depending on the uniformity of the beam is advantageous or disadvantageous.

It is known that a proficient hand-gunner is able to hit a two-inch disk at the distance of 25 feet and a three-inch disk at a much greater distance. With addition of the dazzler 10, it is expected that the handgun can be pointed with at least the same accuracy since the direction is visible to the user. The analysis shows that to if a hand-gunner is able to hit a target with a 250 mm spot-size by a handgun at the distance, a target with a 125 mm spot-size can be hit by the dazzler. The size reduction of 2 ultimately results in an increase in useable range. For example, the empirical data show that, with the configuration of mounting the beam projector module 14 on a pistol that is plugged into a fiber leading from the backpack to the pistol, the useable range of the dazzling beam is extended from 30 feet to about 100 feet. This extension of useable range is particularly useful for law enforcement officers for clearing a specific area, particularly the area beyond the gun shooting range.

In addition to projecting a beam that makes the right spot size, the laser projector module can also create temporally and spatially varying optical patterns as a beam modulator. The addition of a mechanical or an optical component to the beam projector such that the output beam is variable in space and time "kaleidoscope effect" is expected to increase the effectiveness of the dazzler.

There are several factors that drive the light source selections, including visibility of the light (lumen), effectiveness in creating dazzle, cost, size and weight of the source, power input, amenability to temporal modulation, and beam quality (brightness). Generally speaking, it is more economically to get red diode lasers at longer wavelength and blue/violet diode laser at shorter wavelength for each unit Watt. The visibility of red light drops significantly at night, while the blue/violet light with visibility improves at night. As discussed above, there is a significant amount of fluorescence that occurs when objects are illuminated with ultraviolet light. For these reasons, red and violet lasers generating light at 650 nm and 405 nm are selected in the embodiment as shown in FIG. 2. It may be preferable to use either longer or shorter wavelength lasers to improve effectiveness which is to be determined by tests. With regard to the green laser, neodymium lasers with differing hosts shifting the wavelength by a small amount have been selected. Again, the power for each wavelength of light is determined according to the requirement to achieve dazzle effect the eye safety standard. New light sources near 480 nm and 505 nm are becoming available that can be considered for the dazzlers.

The wavelength versatility is achieved by incorporating different wavelength lasers in the laser beam module. Each of the lasers is operative to generate a wavelength range of light. For example, the red laser beam ranges between 630 nm to 800 nm, the violet/blue laser beam ranges between 440 nm to about 380 nm, and the green laser can be switched between 515 nm and 542 nm. The color laser beams can also be generated simultaneously to provide a mixed color beam that is more dazzle effective. The red laser can be replaced or supplemented by a deep red laser emitting light at the wavelength from 800 nm to 1600 nm.

As mentioned above, temporal variation of the laser output may enhance dazzle effectiveness. For the red and violet diode lasers, varying the output at rate between about 7 Hz to about 20 Hz is a very straightforward matter by varying the input current. The lasers respond very quickly with the current variation, and a variety of waveforms can be used. The green laser is preferably produced by a continuous-wave (CW) diode pumped ND laser with an optical doubler that converts the near infrared light into the green wavelength. These doubled Nd lasers are designed to operate continuously. New versions are becoming available that will allow temporal modulation. Pulsed diode pumped Nd lasers with doublers are available, but tend to run at 20 kHz and produce very short pulses in the nanosecond range. A switch or other modulator may be used to obtain a green laser beam with the desired rate.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed:

1. A laser system architecture operative to provide dazzle effect to a target at various distances, comprising:
    a multi-wavelength laser module, having a plurality of lasers each being operative to generate a wavelength range of light with an irradiance adjustable based on the distance to the target; and
    a beam projector module operative to project the light generated by the multi-wavelength laser module to the target.

2. The system of claim 1, wherein the multi-wavelength laser module is assembled on a board and disposed in a portable case.

3. The system of claim 1, wherein the each of the lasers is operative to output the corresponding wavelength range of light with a predetermined flickering frequency effective to dazzle the target.

4. The system of claim 1, wherein the multi-wavelength laser module includes a red laser, a green laser and a violet laser.

5. The system of claim 4, wherein the multi-wavelength laser module includes a red laser operative to generate a light beam within a wavelength range of 630 nm to 800 nm, a green laser operative to generate a light beam at a wavelength of 515 nm or 542 nm and a violet laser operative to generate a light beam at wavelengths of 440 nm and 380 nm.

6. The system of claim 4, wherein the multi-wavelength laser module further comprises a deep-red laser operative to generate a light beam within a wavelength range of 800 nm to 1600 nm.

7. The system of claim 4, wherein the red laser is operative to generate a red light beam up to a power of 500 mW, the green laser is operative to generate a green light beam up to a power of 500 mW, and the violet laser is operative to generate a violet/blue light beam up to a power of about 500 mW.

8. The system of claim 1, wherein the multi-wavelength laser module includes a near ultra-violet light source operative to generate light at a wavelength range between 310 nm to 380 nm or 400 nm for allowable high irradiance and resulting fluorescence.

9. The system of claim 1, wherein each of the lasers comprises an optic component for coupling the laser beam generated thereby to an output aperture.

10. The system of claim 9, wherein the optic component includes a lens or a fiber optical cable.

11. The system of claim 1, wherein the multi-wavelength laser module further comprising a plurality of pulse duration controllers for individually controlling pulse duration of the light beams generated by the lasers.

12. The system of claim 1, wherein the beam projector module comprises at least one moveable lens for controlling divergence of the light projected thereby.

13. The system of claim 12, wherein the beam projector module further comprising a collimator for collimating the light generated by the multi-wavelength laser module.

14. The system of claim 1, wherein fiber optical beam delivery system further comprising a plurality of wires for transmitting signals from the beam projector module to the multi-wavelength laser module.

15. The system of claim 14, wherein the signals carrying activation and operation information for the multi-wavelength laser module.

16. The system of claim 1, further comprising a sound generating source for dilating eye of the target, so as to improve dazzle effect provided by the light projected by the beam projector module.

17. The system of claim 1, further comprising a scatterer for scattering the light projected by the beam projector module around the target.

18. The system of claim 1, further comprising a target locator for actively tracking location of the target and providing location information of the target.

19. The system of claim 18, further comprising an intelligent controller for adjusting power level of the light beam generated by each laser according to location information provided by the target locator.

20. The system of claim 1, further comprising a fiber optic beam delivery system having a fiber optical cable for delivering the light generated by the multi-wavelength laser module to the beam projector module.

21. The system of claim 1, wherein the beam projector module further comprises a mechanical or optical modulator to produce spatially and temporarily varying irradiance.

22. A color dazzle system comprising a plurality of laser beam sources each being operative to generate a specific wavelength range of light with a power adjustable according to a location of a target to be dazzled, wherein at least a portion of the laser beam sources are operative to respond quickly enough to variation of input currents applied thereto, so as to vary outputs thereof at rates effective to provide dazzle to the target.

23. The color dazzle system of claim 21, further comprising a beam projector module for projecting light selectively generated by the laser beam sources to the target.

24. The color dazzle system of claim 22, wherein the beam projector module includes at least an optical component for zooming the light.

25. The color dazzle system of claim 22, wherein the beam projector module includes a handheld unit firing like a pistol or a rifle.

26. The color dazzle system of claim 22, wherein the laser beam sources are assembled within a case carried in a backpack.

27. The color dazzle system of claim 22, wherein the laser beam sources and the beam projector module are mounted in a turret.

28. A method of applying non-lethal dazzle effect to a target, comprising:
   a) assembling a plurality of dazzle beam sources each being operative to generate a dazzle beam at a unique wavelength range;
   b) selectively activating the dazzle beam sources and generating the dazzle beams at the corresponding wavelength range; and
   c) adjusting power of the dazzle beams according to the corresponding wavelength range and a distance to the target.

29. The method of claim 28, further comprising the step of:
   d) alternately activating the dazzle beams between selective wavelength ranges with a rate effective to dazzle the target.

30. The method of claim 28, further comprising the step of adjusting divergence of the dazzle beams according to a distance to the target or other target characteristics.

* * * * *